United States Patent [19]

Weis

[11] Patent Number: 5,652,509

[45] Date of Patent: Jul. 29, 1997

[54] DEVICE FOR DETERMINING THE VELOCITY OF A LONGITUDINALLY TRAVELING ELONGATE TEXTILE MATERIAL, ESPECIALLY A YARN, USING ELECTRONIC SENSORS

[75] Inventor: Manfred Weis, St. Wendel, Germany

[73] Assignee: W. Schlafhorst AG & Co., Moenchengladbach, Germany

[21] Appl. No.: 533,071

[22] Filed: Sep. 25, 1995

[30] Foreign Application Priority Data

Sep. 24, 1994 [DE] Germany .......................... 44 34 234.9

[51] Int. Cl.$^6$ ............... G01P 3/36; G01P 3/80; B65H 59/38; B65H 63/00
[52] U.S. Cl. ............... 324/175; 324/178; 356/28
[58] Field of Search ........................... 324/175, 178, 324/206, 658, 663; 356/28; 250/215, 216, 571

[56] References Cited

FOREIGN PATENT DOCUMENTS

| 0 000 721 A1 | 7/1977 | European Pat. Off. . |
| 0 582 112 A1 | 8/1992 | European Pat. Off. . |
| 19 22 461 | 4/1969 | Germany . |
| 25 44 819 A1 | 4/1977 | Germany . |
| 42 25 842 A1 | 2/1994 | Germany . |
| 1321 | 12/1991 | Japan . |
| 669 777 A5 | 4/1989 | Switzerland . |

OTHER PUBLICATIONS

Prof. Dr.–Ing. habil. Roland Backmann et al, "Beruhrungslose Geschwindigkeitsmessung am laufenden Faden," Melliand Textilberichte, Jul./1993, 639–40.

Werner Ringens et al, "Optoelektronischer Sensor zur beruhrungslosen Geschwindigkeitsmessung an textilen Oberflachen," Textil Praxis International, Jun. 1988.

Primary Examiner—Walter E. Snow
Attorney, Agent, or Firm—Shefte, Pinckney & Sawyer

[57] ABSTRACT

A device for determining the velocity of a longitudinally traveling textile material, especially a yarn, using the closed-loop correlation of a transit time correlator in such a way that its reliability is improved. At least one sensor $g_1$ consists of two signal receivers disposed one behind the other in the running direction of the yarn, having a sensor output characteristic curve with the intersection of the abscissa in the effective sensor center axis, and wherein the output characteristic curve shows a point-symmetrical behavior at least in the vicinity of the intersection with the abscissa. A second sensor $g_2$ has a steady state output characteristic curve in the area of its effective sensor center axis. The control loop circuit of the transit time correlator is designed such that the undifferentiated cross-correlation function is used as the controller input signal for determining and readjusting the adjustment point for the model delay time $\tau$. Optionally, the output characteristic curves of the sensors have amplified outputs. The determination of the adjustment point and the stability of the control loop circuit can be further improved by the use of a third sensor with an output characteristic curve corresponding to that of the second sensor, and of a fourth sensor for providing a range preselection for the feed-back integrator of the transit time correlator.

11 Claims, 6 Drawing Sheets

DEVICE FOR DETERMINING THE VELOCITY OF A LONGITUDINALLY TRAVELING ELONGATE TEXTILE MATERIAL, ESPECIALLY A YARN, USING ELECTRONIC SENSORS

FIELD OF THE INVENTION

The present invention relates to a device for determining the velocity of an elongate textile material, in particular a textile yarn, traveling in longitudinally in its lengthwise dimension, wherein two sensors disposed at a predetermined spacing along the direction of traveling movement of the textile yarn produce measured sensor signals which are evaluated using a transit time correlator having a control loop circuit adjusted to a model delay time which corresponds to the actual transit time of a yarn section over the distance and the traveling velocity is calculated by a dividing element connected to the control loop circuit of the transit time correlator for determining a quotient, representing yarn velocity, from the distance and the model delay time.

BACKGROUND OF THE INVENTION

Many textile machines wherein textile yarns travel longitudinally along their length to be subsequently wound require a device for monitoring the velocity or the length of the traveling textile yarn then wound. The result is used, for example, to correct deviations in velocity and to obtain as accurate as possible information regarding the length of the yarn which has been wound as of any given time.

For example, in connection with bobbin winding machines producing cheese-type bobbins, or yarn packages, there is often a requirement that all produced bobbins have exactly the same yarn length if possible. This is primarily necessary if these bobbins are to be subsequently placed on a creel and drawn off together to form a warp beam. Different yarn lengths lead to residual yarn of different lengths on the bobbin tubes in such a case. With yarn material of high quality this results in unacceptable, and possibly costly losses.

A widely used method to determine the yarn length on such bobbin winding machines is to count the revolutions of the bobbin or of the drive roller for the bobbin and to determine the wound-on amount of yarn using calculations based on the circumference of the bobbin or of the drive roller for the bobbin. Since the circumference of the drive roller is constant, the determination of the circumferential velocity poses no problems. Nevertheless, the slippage which typically occurs between the drive roller and the bobbin can be a considerable source of errors. The resultant calculated velocity or yarn length value may be greatly distorted since, to avoid so-called "pattern winding," a slippage between the drive roller and the bobbin is intentionally generated during the entire bobbin travel or at least in so-called pattern zones in which the bobbin diameter and the diameter of the drive roller have a defined relationship to each other.

Measuring the number of bobbin revolutions is relatively simple. However, the exact determination of the progressively changing diameter (and in turn the bobbin circumference) occurring during the course of bobbin winding can be problematical. If the angle of rotation of the bobbin support is used as the measurement for the bobbin radius, considerable errors can also result because of deviations in the pressure of the bobbin on the drive roller.

A number of methods are known for determining the yarn velocity by contact with the yarn. Such a method increases the yarn tension and is unsuitable for higher re-spooling velocities because of the inertia of the element which is moved along with the yarn.

To avoid the mentioned disadvantages it has been proposed in European Patent Publication EP 0 000 721 A1 to determine the yarn velocity by means of two contactless operating sensors placed at a fixed distance from each other. Optically or capacitively operating sensors, for example, are suited for this purpose. These sensors determine stochastic yarn signals in the form of analog noise signals resulting from irregularities of the yarn surface or yarn mass in the longitudinal direction of the traveling yarn. The stochastic signal detected upstream in the direction of travel is temporally displaced sufficiently far until it shows a maximal similarity with the stochastic signal detected at the sensor placed downstream, indicating the time delay existing between the two signals. The delay of the first signal determined in the course of this operation corresponds to the length of time the yarn requires to travel from the first to the second sensor. Since the distance between the two sensors is known, it is possible in this way to easily determine the yarn velocity. However, the mathematical operations, which are customarily called a cross-correlation method, are subject to a certain expenditure of time. This poses no problems if the yarn is subjected to no or only very small accelerations. However, more rapid velocity changes, such as those which occur in the winding process because of common patterning disturbances, for example, cannot be handled in such a way that an exact measurement can take place. Since differentiation of the cross-correlation function is required for determining the primary maximum of this function, the measured value data scatter increases with low signals in relation to the noise acting as an interference value.

SUMMARY OF THE INVENTION

It is therefore an object of the present invention to provide an improved device and method for measuring the velocity of a traveling textile material with a high degree of accuracy.

To that end, a device for determining the velocity of an elongate textile material, in particular a textile yarn, traveling longitudinally in its lengthwise dimension, is disclosed wherein two sensors are disposed at a predetermined distance along the direction of traveling movement of the textile yarn which produce measured sensor signals which are evaluated using a transit time correlator having a control loop circuit adjusted to a model delay time which corresponds to an actual transit time of a yarn segment over the predetermined distance, and that the velocity is calculated by a dividing circuit element connected to the control loop circuit of the transit time correlator, for obtaining a quotient from the predetermined distance and the model delay time. The velocity determination device according to the present invention includes at least one first sensor $g_1$ including at least two signal receivers (1,2; 5,6; 9,10; 17,18; 25,26,27,28) disposed in sequence along the travel direction of the yarn, the first sensor $g_1$ having a sensor output characteristic curve which intersects the abscissa, indicating a zero instantaneous output value, on the effective sensor center axis, and wherein said output characteristic curve shows a point-symmetrical behavior at least in the vicinity of the intersection with the abscissa. Further, the present invention includes a second sensor $g_2$ having a steady state output characteristic curve waveform in the area of its effective sensor center axis, and a control loop circuit for the transit time correlator that includes means for using an undifferentiated cross-correlation function as the controller input signal for determining and readjusting an adjustment point for the model delay time $\tau$.

In contrast to the known use of a transit time correlator based on a closed loop correlation, a differentiation of the cross-correlation function is no longer required with the present invention. In the process, a point-symmetrical (at least in the vicinity of the adjustment point) function is employed for determining the adjustment point which utilizes the main advantage of the closed loop correlation over the open loop correlation. The adjustment point which results with a time displacement over a model delay time $\tau$, which corresponds to the actual transit time T of a yarn section over the distance L between two sensors, is located on the intersection of the cross-correlation function with the abscissa, in other words, the minimum value of the cross correlation function. The calculation effort and the measured value data scatter associated with a low signal is reduced in respect to the noise conditions and to the sensitivity to interference signals as a whole because of the omission of the differentiation in relation to a transit time correlator on the basis of the known closed loop correlation. In addition, this results in the advantage that the transit time estimate or the determination of the adjustment point can take place to a great extent by means of linear averaging over a velocity range.

Assuming that the temporal cross-correlation function $\Phi(\tau)$ is formed by superposition of the sensor correlation function $R_{g_1g_2}$ with the local auto-correlation function of the inhomogeneities of the material to be measured, a rounding of the corners of a plot of the cross-correlation function $\Phi(\tau)$ in respect to the sensor correlation function $R_{g_1g_2}$ results, caused by the texture of the textile material to be measured. The slope of the cross-correlation function as a whole, but also in the range of the adjusting point, increases with an increasing critical frequency of the texture. This dependency of the slope of the cross-correlation function is, however, considerably less than with the known closed loop correlation. This has very advantageous results on the stability of the control loop circuit in relation to changing textures, because the changes in the slope of the correlation function directly result in a proportional change of the loop amplification of the adjustment control loop circuit.

It is preferred that the first sensor $g_1$ has a point-symmetrical output characteristic curve. It is further preferred that the second sensor $g_2$ has an output characteristic curve which is symmetrical in respect to its sensor center axis.

The combination of output signals resulting from the use of a first sensor $g_1$ having a point-symmetrical output characteristic curve, such as a square wave, and of a second sensor $g_2$ having an output characteristic curve symmetrical in relation to its respective sensor central axis results in a point-symmetrical sensor correlation function $R_{g_1g_2}$ and therefore also in a point-symmetrical cross-correlation function $\Phi(\tau)$ over the entire waveform. This results in the suppression of systematic errors even at greater velocity fluctuations.

Preferably, the second sensor $g_2$ has an output characteristic curve that displays a balanced output. Similarly, the first sensor $g_1$ may have an output characteristic curve of the first sensor $g_1$ displays a balanced output. When using sensors with characteristic curves having a balanced output, sensor signals $S_1(t)$ and $S_1(t)$ free of mean values result, so that it is possible to omit a high-pass filter which otherwise is generally required in the signal field. This applies in particular if the signal should be clipped prior to further processing.

The first sensor $g_1$ and the second sensor $g_2$ preferably have output characteristic curves such that by shifting one of the sensors by a predetermined amount equal to the effective distance L between the center axes of the first sensor and the second sensor in the direction toward the other sensor, the respective sensor output characteristic curves are periodic functions having a phase difference of 90°. The behavior of the sensor output characteristic curves as periodic functions with a phase difference of 90° provides a sensor correlation function with periodic behavior resulting therefrom which is point-symmetrical in relation to the adjustment point.

The sensors $g_1$, $g_2$ preferably have output characteristic curves having a square waveform. It is not difficult to obtain sensors having sensor output characteristic curves with a square waveform by means of a diode-based circuit. This also results in sensor correlation functions with a linear path between two respectively adjoining extreme points, but at least between the intersection points with the abscissa, or zero value points, and the adjoining extreme, or maximum value points. This further simplifies the evaluation.

A third sensor $g_3$ having an output characteristic curve similar to that of the second sensor $g_2$ is disposed within said device such that its effective sensor center axis is coincident with the effective center axis of the first sensor $g_1$. The employment of a third sensor $g_3$ with an output characteristic curve coincident with that of the second sensor $g_2$ reduces the scattering of transit time estimated values. In this case the control input signal becomes zero if $\tau=T$. As a result the scattering of the transit time estimate disappears if no interference signals are present.

A summation circuit is provided for determining a difference between a second sensor signal $S_2$ and a third sensor signal $S_3$, and for forming a difference signal which is used with a first sensor signal for forming the cross-correlation function used as the controller input signal.

Further, the first sensor $g_1$ and second sensors $g_2$ may be arranged such that a distance L between said first sensor $g_1$ center axis and said second sensor $g_2$ center axis is such that a maximum value of the sensor correlation function $R_{g_1g_2}$, which adjoins the intersection of the sensor correlation function $R_{g_1g_2}$ derived from the product of the sensor output characteristic curves with the abscissa, lies on the ordinate.

To prevent the controller from locking on to another intersection with the abscissa, in other words a false minimum value, in case of larger velocity fluctuations, it is advantageous to make the distance L between the first and second sensors $g_1$, $g_2$ such that the adjoining extreme point, or maximum value, of the sensor correlation function $R_{g_1g_2}$ lies on the ordinate. By means of this it is possible from the start, beginning at this extreme point, to "run up" the control loop circuit directly to the intersection with the abscissa, or minimum value which corresponds to the adjustment point.

A signal emitter $g_4$ may be provided which transmits velocity signals $s_4$ which are approximately proportional to the yarn velocity, that the signals $s_4$ of the signal emitter $g_4$ can be provided to the transit time correlator for range preselection for the lock-on of the control loop circuit on the real intersection of the cross-correlation function $\Phi(\tau)$ with the abscissa. A further possibility of preventing the transit time correlator from locking on to a false minimum value of the cross-correlation function $\Phi(\tau)$, even with greater velocity fluctuation, consists in using the additional signal emitter $g_4$, by means of which the controller is provided with a range preselection for the range in which the adjustment point is located.

The invention will be described in detail below by means of exemplary embodiments represented in the associated drawings.

BRIEF DESCRIPTION OF THE DRAWINGS

FIG. 3b represents a block wiring diagram for a transit time correlator for utilization of the signals $s_1(t)$ to $s_3(1)$ generated by the sensors $g_1$ to $g_3$ in accordance with FIG. 3a;

DETAILED DESCRIPTION OF THE PREFERRED EMBODIMENTS

Figure 1A:
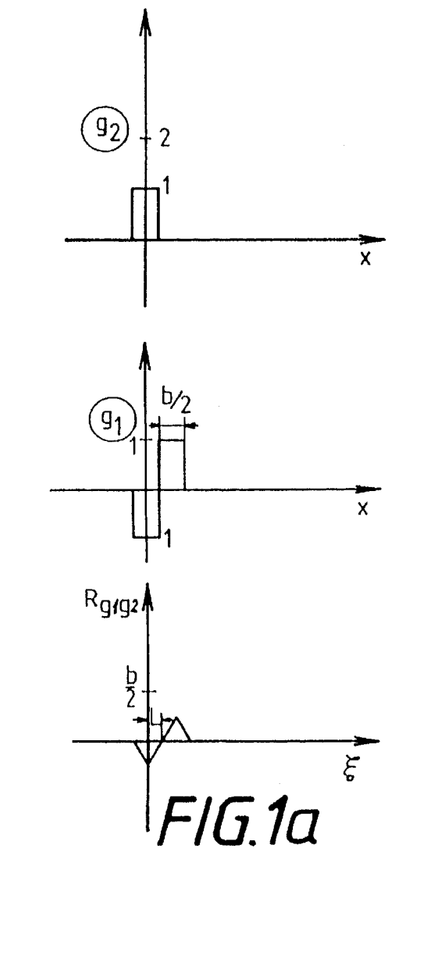
FIGS. 1a to e illustrate various sensor output characteristic curves of sensors $g_1$ and $g_2$ with a plot of the associated sensor correlation function $R_{g_1g_2}$.

Turning now to the drawings, and, more particularly, to FIGS. 1a to 1e, examples of sensor output characteristic curves with the associated sensor correlation function $R_{g_1g_2}$ are illustrated graphically. A particularly simple example is shown in FIG. 1a. In this case the sensors $g_1$ and $g_2$ can be made by appropriately wiring first and second photodiodes illustrated respectively at 1 and 2, in a manner as can be seen in the associated FIG. 2a. In this case the signal $s_2(t)$ of the sensor $g_2$ is directly derived from the first photodiode 1 output signal, with the first photodiode 1 disposed upstream in relation to the yarn running direction. It should be presumed that the yarn travel direction is from left to right with respect to the figures. This standard will hold true throughout the following discussion. The signal $s_1(t)$ of the sensor $g_1$ is formed by means of an summation circuit 3, wherein a negative signal coming from the first photodiode 1 is combined with a positive signal coming from the second photodiode 2. The designation b/2 represents a reference value for the width of a photodiode.

The sensor correlation function $R_{g_1g_2}$ is formed from the product of the output characteristic curves of the sensors $g_1$ and $g_2$. The distance between the sensors is defined as the distance of the effective sensor center axes. With reference to the sensor arrangement in FIG. 2a, the effective sensor center axis of the sensor $g_2$ lies in the center of the first photodiode 1, while the effective sensor center axis of the sensor $g_1$ lies at the separation line between the photodiodes 1 and 2. The distance L is therefore equal to ½ (b/2) or b/4.

As can be seen in FIG. 1a, the intersection of the sensor correlation function $R_{g_1g_2}$ with the abscissa, or the minimum value, is displaced a distance L from the ordinate, or $\epsilon$=L. The position of this intersection point coincides with the intersection of the sensor output characteristic curve of the sensor $g_1$. In other words, the minimum value of the sensor cross-correlation function is coincident with the instantaneous zero value of the sensor output characteristic curve. To obtain such a sensor output characteristic curve from the sensor $g_1$, the sensor must consist of two signal receivers, in this case the photodiodes 1 and 2, disposed one behind the other in the running direction of the yarn.

Since the effective sensor center axes form the basis for the definition of the distance of the sensors from each other, which on the one hand is based on the calculation of the model delay time $\tau$ as well as the velocity, the intersection point of the sensor output characteristic curve of the sensor $g_1$ with the abscissa, or when the output value goes through zero, in the effective sensor center axis is a prerequisite for the intersection of the sensor correlation function $R_{g_1g_2}$, as well as the cross-correlation function $\Phi(\tau)$, with the abscissa, indicating minimum values for both functions. In this manner, this intersection can be used directly, i.e. without any prior differentiation, for determining the adjustment point for the model delay time ($\tau$). In other words, since the output characteristic curve of the sensor crosses a zero value coincident with the minimum values for both the sensor correlation function $R_{g_1g_2}$ and the cross-correlation function $\Phi(\tau)$, differentiation is no longer required for determining the adjustment point for the model delay time ($\tau$) and time savings are realized with respect to the calculation of yarn velocity.

Because of the point-symmetric behavior of the output characteristic curve of the sensor $g_1$ and the steady output characteristic curve waveform of the sensor $g_2$ in the area of the respective effective sensor center axis in this area the sensor correlation function $R_{g_1g_2}$ or the cross-correlation function $\Phi(\tau)$ also behave point-symmetrically. This is a prerequisite for the suppression of systematic errors based on the surface quality of the yarn when determining the adjustment point.

Figure 1B:
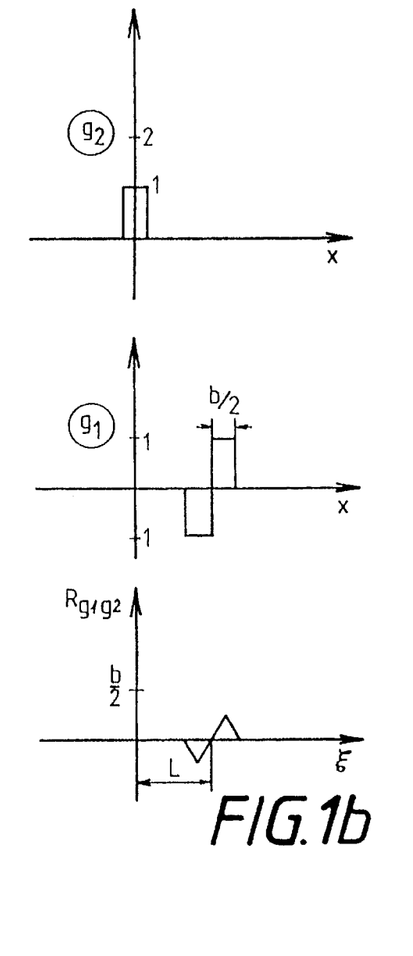
Figure 2A:
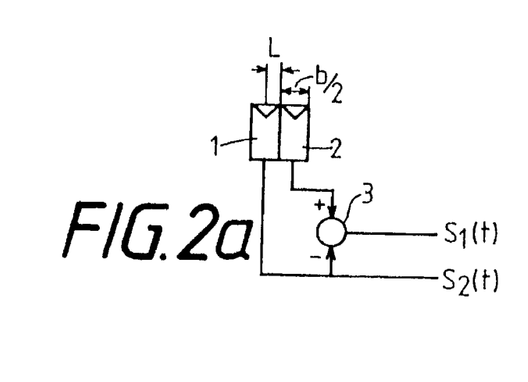
FIGS. 2a to e illustrate the associated sensors with the wiring of the diode circuits.
Figure 2B:
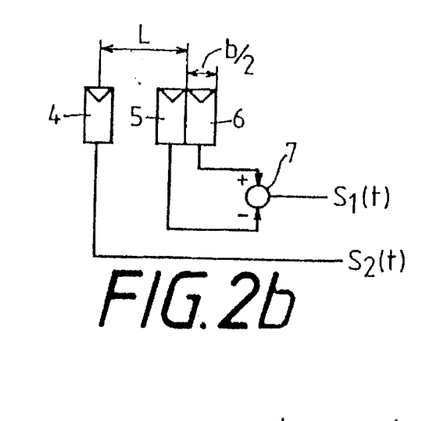

A variant of FIG. 1a is represented in FIG. 1b which differs from the first variant in that the distance L has been increased from the value illustrated in FIG. 1a. However, an additional expenditure is associated with this because three photodiodes 4,5,6 must be employed.

The same sensor output characteristic curves were also used with the variants shown in FIGS. 1c and d, but here again a different distance L between the effective sensor center axes was selected. Accordingly, the respectively required number of photodiodes 8,9,10,11,12,13,14,15,16, 17,18 also changes in the associated FIGS. 2c and 2d.

Figure 2C:
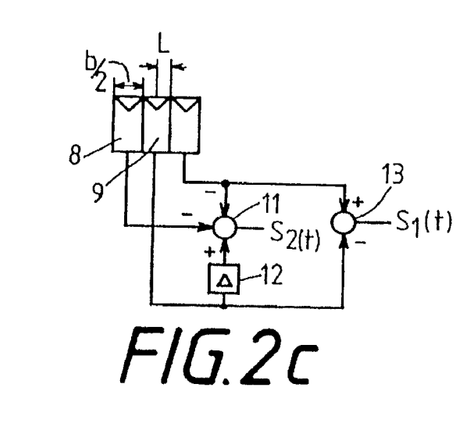
Figure 2D:
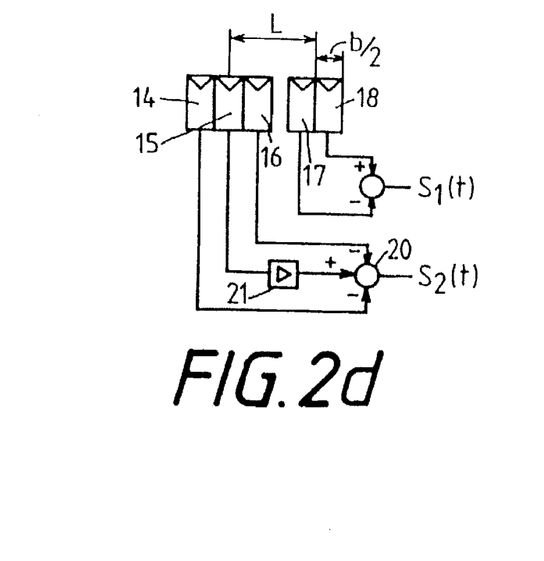

It should be stressed that here the sensor output characteristic curve of the sensor $g_2$ also has a characteristic curve having a balanced output. This is achieved using amplifiers 12,21, which double the signal strength, as can be seen in FIGS. 2c and 2d. The result of this is that the sensor signal from the sensor $g_2$ $s_2(t)$ is also free of mean values. Because of that it is possible to omit a high-pass filter in the signal path which would have to be used particularly if the signal should be clipped prior to further processing.

Figure 1C:
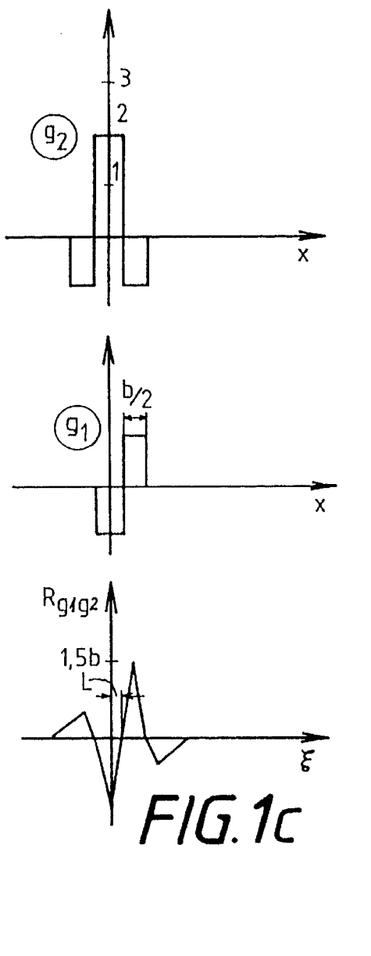
Figure 1D:
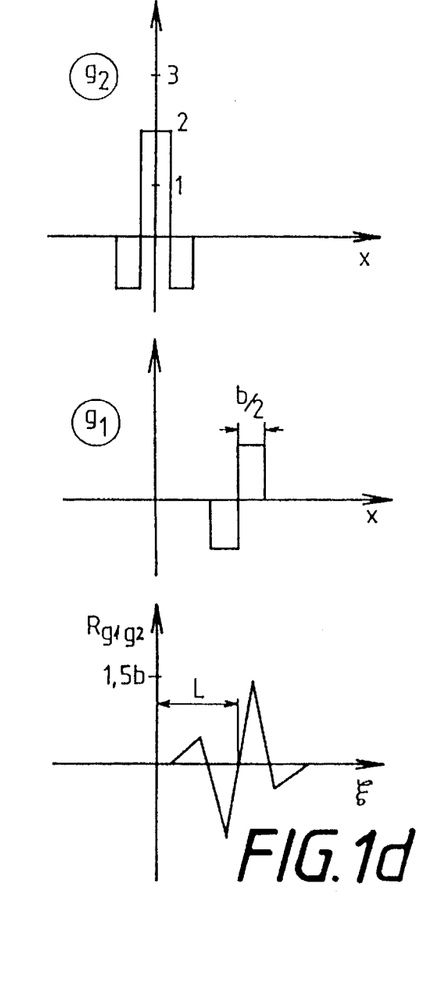

Aside from the fact that in the variant shown in FIG. 1c and 2c only one diode circuit with three photodiodes 8,9,10 is required, its minimum, which is adjacent to the minimum value, or the intersection point of the sensor correlation function $R_{g_1g_2}$ with the abscissa, is located on the ordinate, indicating a minimum output value greater than zero. Accordingly, at the start of operations, the control loop circuit can be "run up," starting at this minimum, as far as this intersection, because of which a lock-on of the cross-correlation function $\Phi(\tau)$ takes place at the intersection with the abscissa corresponding to the adjustment point.

Figure 1E:
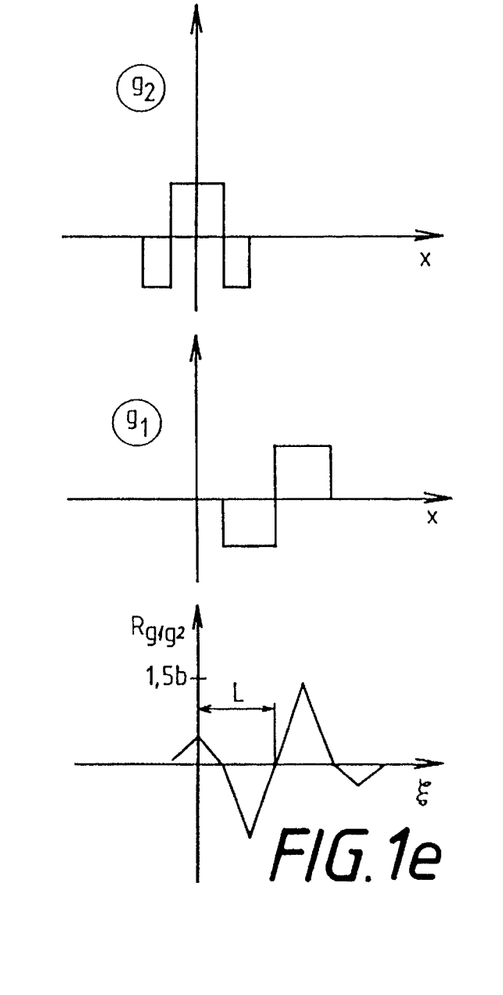
Figure 2E:
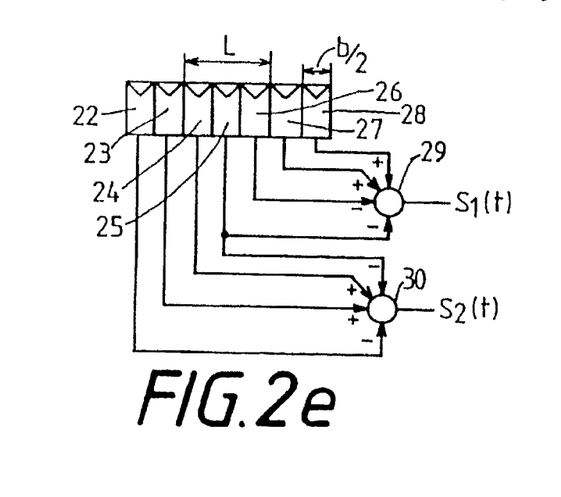

A sensor correlation function which is broader than those discussed with the previous examples results in connection with the embodiment represented in FIG. 1e and 2e. While a narrower sensor correlation function $R_{g_1g_2}$ is more advantageous in regard to the scattering of the estimated transit time data, the collecting range of the adjustment point is greater, which has advantages in regard to the stability of the control loop circuit. A broad sensor correlation function is of particular advantage if the velocity greatly fluctuates during the time of measuring and if the mean velocity is of interest.

It is possible to obtain the sensor output characteristic curves of the sensors $g_1$ and $g_2$ of FIG. 1e using the diode circuit of the photodiodes 22,23,24,25,26,27,28 of FIG. 2e. In this case only the photodiode 25 is used for both sensors $g_1$ and $g_2$. However, it is also possible to select the distance L to be equal to b/2, in which case only five photodiodes would be required for the diode circuit, of which the four photodiodes located downstream in the running direction of the yarn would be respectively used in an analog manner for both sensors $g_1$ and $g_2$. It may be appreciated that, the sensor signals $s_1$ and $s_2$ here are also free of mean values due to the amplified outputs of the sensor output characteristic curves.

Figure 3A:
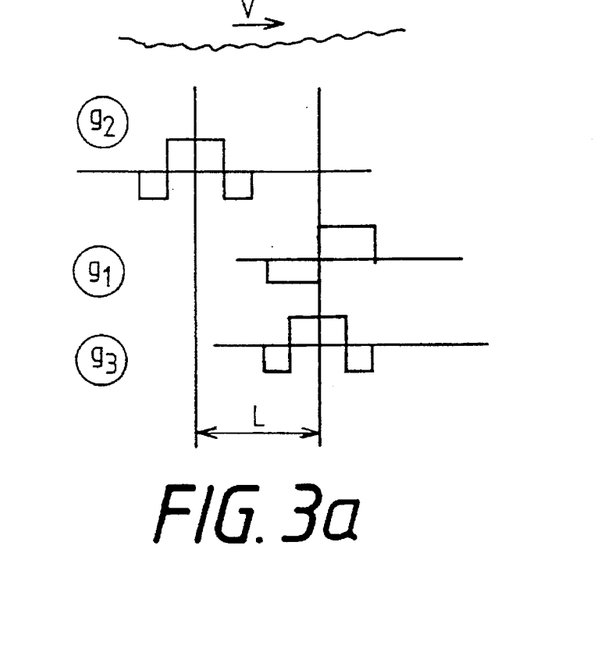
FIG. 3a illustrates the sensor output characteristic curves of sensors $g_1$ to $g_3$.
Figure 3B:
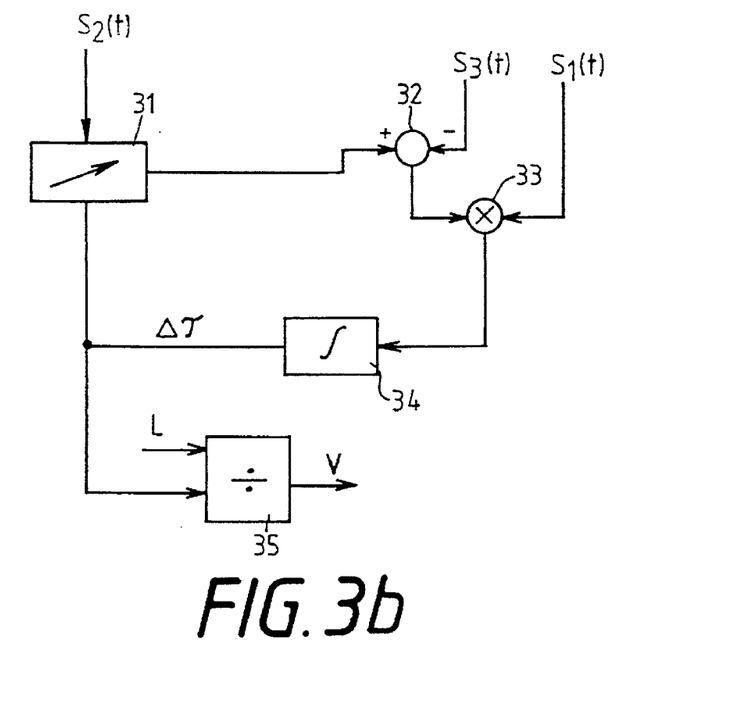

Another embodiment of the present invention is represented in FIG. 3a by means of the sensor output characteristic curves of sensors $g_1$ to $g_3$. FIG. 3b illustrates the associated block wiring diagram for an associated transit time correlator circuit.

The third sensor $g_3$ is disposed in a manner wherein its output characteristic curve agrees with that of the second sensor $g_2$ and sensor $g_3$ is nonetheless arranged in a manner wherein its effective sensor center axis coincides with that of the first sensor $g_1$. In this manner, the output characteristic curve of the sensor $g_3$ is displaced by an amount L in respect to the output characteristic curve of the sensor $g_2$.

The result of this is that the signal $s_2(t)$, which is displaced by the model delay time $\tau=T$, of the second sensor $g_2$ is identical with the not-temporally-displaced signal $s_3(t)$ from the third sensor $g_3$. The result in the case of $\tau=T$ therefore is the initial value zero because of the different sign valuation at an addition point 32. Therefore, a noise signal which may be present along with the signal $s_1(t)$ of the sensor $g_1$ is eliminated as an input value of the integrator 34. The scattering of the transit time estimate data therefore disappears. The output signal $\Delta\tau$ of the integrator 34 acting as a feedback integrator is therefore also equal to zero. In this way and with constant velocity, the delay time $\tau$ is not unnecessarily adjusted in a delay circuit 31.

The controller output signal $\Delta\tau$ is also transmitted to a dividing element 35, whereby the value for $\tau$, by which the constant value L is divided, is also readjusted there, if necessary. The respective instantaneous value of the velocity is present at the output of the dividing element 35.

Figure 4:
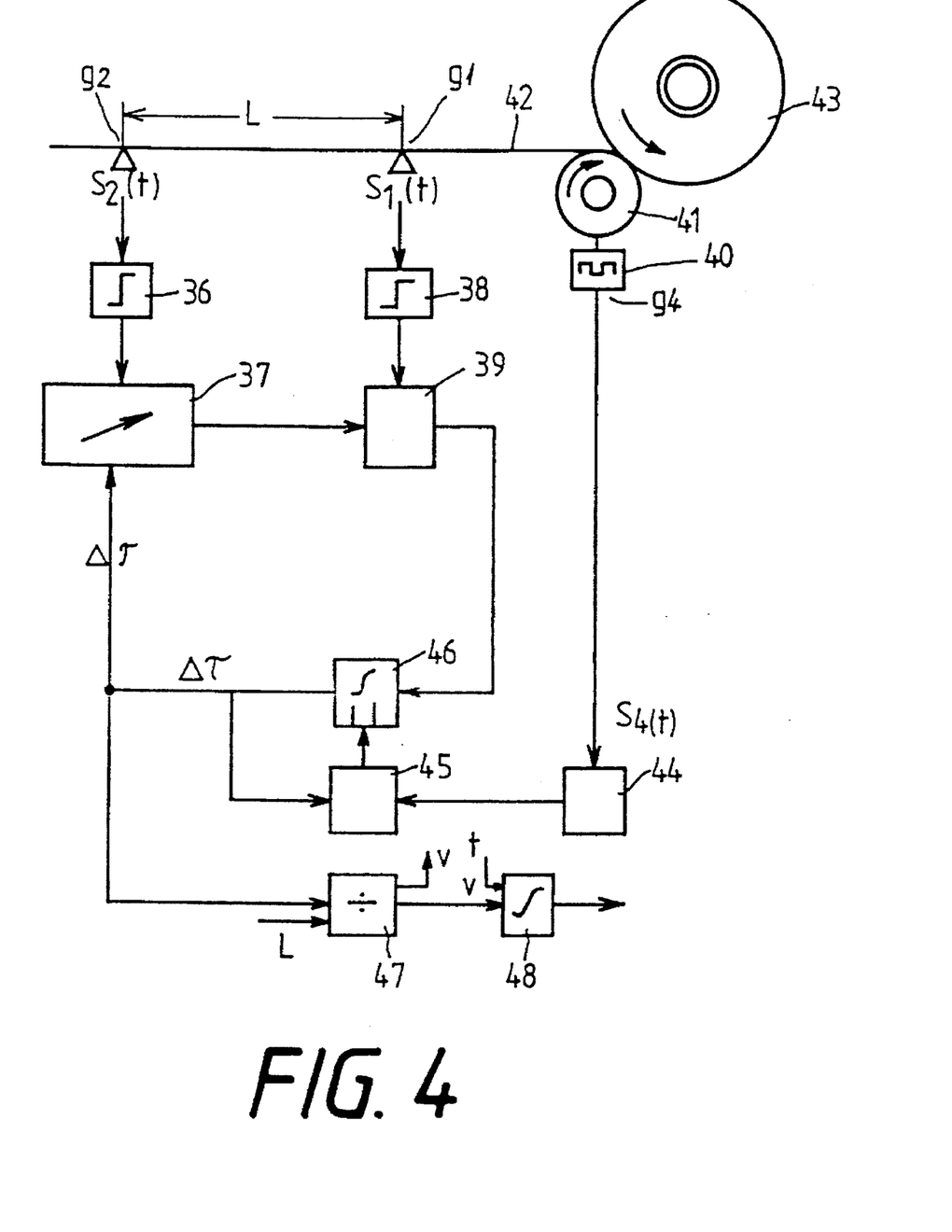
FIG. 4 illustrates a block wiring diagram for a transit time correlator with an additional sensor $g_4$.

An additional embodiment of the present invention is illustrated with a block wiring diagram in FIG. 4. There, a sensor $g_4$ is employed which generates an output signal sequence $s_4(t)$. Although a sensor $g_3$ is not included here, it could also be employed. The sensor $g_4$ is essentially a pulse sensor 40, by means of which pulses are received from a drive drum 41 for a bobbin 43. For example, and as will be appreciated by those skilled in the art, the drive drum 41 can have a field spider to which stationary Hall sensors are assigned. Thereby, a number of pulses corresponding to the number of poles of the field spider are generated during a revolution of the drive drum 41. This signal sequence $s_4(t)$ is counted in a counter 44. The time-dependent counting results are then issued to a digital range comparator 45 which is supplied with the controller output signal $\Delta\tau$ from the output of the integrator 46. The output of the range comparator 45 is connected with the integrator 46, in which a range preselection for the position of the adjustment point takes place. Therefore, it is possible to effectively prevent the control loop circuit from locking on an intersection of the cross-correlation function $\Phi(\tau)$ with the abscissa, or minimum value thereof, which does not correspond to the sought adjustment point. It is possible to additionally supply this range comparator 45 with an offset entry capability, not shown here, by means of which the width of the range can be set.

Although the signal of the sensor $g_4$ is not very exact due to the slippage between the drive drum 41 and the bobbin 43, it is sufficient for a range preselection for the integrator of the transit time correlator. In this manner, the correct adjustment point is immediately found with practically no increase in computing capacity requirements, even at higher velocity changes.

In the example in accordance with FIG. 4 the analog signals $s_2$ and $s_1$ are digitized by triggers 36 and 38, and are quantized to one bit. The computing outlay is small, so that an 8-bit micro-controller is sufficient for adjusting the pattern transit time $\tau$. Accordingly, the integrator 46, the range comparator 45, the delay member 37 and the multiplier 39 have been replaced by digital components. For example, the delay member 37 can be replaced by a shift register, while the multiplier 39 is a phase detector. A dividing element 47 and a further integrator 48 are also digital.

From the start of winding of a bobbin, the yarn length wound on the bobbin tube is cumulatively determined in the integrator 48 on the basis of the velocity and the winding time. In this way it is possible to determine the yarn length wound on the bobbins with heretofore unrealized accuracy.

Figure 5:
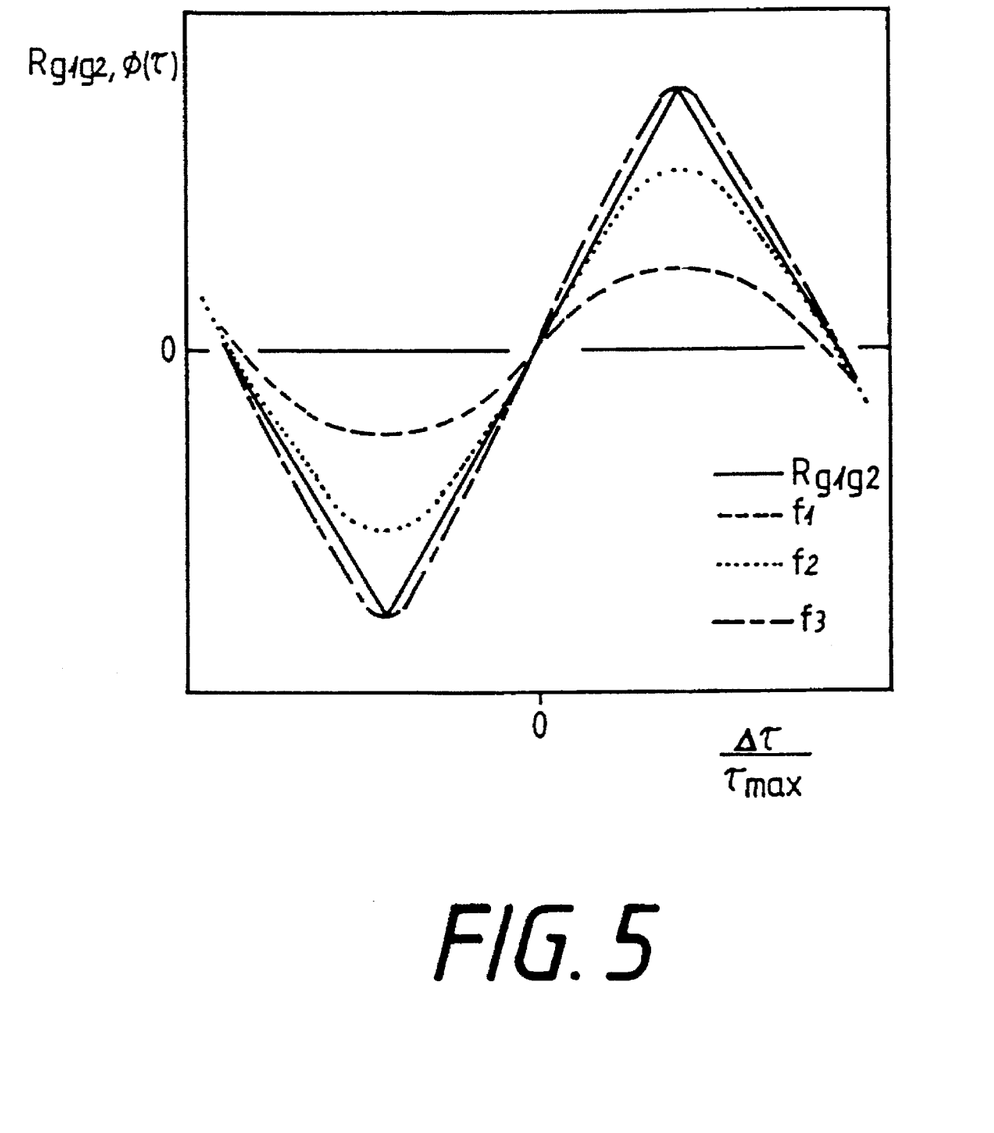
FIG. 5 is a graphic representation of cross-correlation functions depending on the texture of the yarn.

FIG. 5 illustrates a plot of cross-correlation functions generated in accordance with the sensor output characteristic curves and sensor arrangements according to the present invention. It can be seen here that the slope of the cross-correlation function changes with the bandwidth of the texture of the yarn (critical frequency $f_1<f_2<f_3$). This dependence of the slope of the cross-correlation function, however, is considerably less than with the transit time correlation using the differentiated correlation function. This has very positive effects on the stability of the control loop circuit in respect to variable textures, because the changes of the slope of the cross-correlation function directly result in a proportional change of the loop amplification of the adjustment control loop circuit.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. In a device for determining the velocity of an elongate textile material, in particular a textile yarn, traveling longitudinally in its lengthwise dimension, wherein two sensors are disposed at a predetermined distance L along the direction of traveling movement of the textile yarn which produce measured sensor signals which are evaluated using a transit time correlator having a control loop circuit adjusted to a model delay time $\tau$ which corresponds to an actual transit time T of a yarn segment over the predetermined distance L, and that the velocity is calculated by a dividing circuit element connected to the control loop circuit of the transit time correlator, for obtaining a quotient from the predetermined distance and the model delay time, the improvement comprising:

a first sensor $g_1$ of said two sensors including at least two signal receivers (1,2; 5,6; 9,10; 17,18; 25,26,27,28) disposed in sequence along the travel direction of the yarn, said first sensor $g_1$ having a sensor output characteristic curve which intersects the abscissa, indicating a zero instantaneous output value, in the effective sensor center axis, and wherein said output characteristic curve shows a point-symmetrical behavior at least in the vicinity of the intersection with the abscissa;

a second sensor $g_2$ of said two sensors having a steady state output characteristic curve waveform in the area of its effective sensor center axis; and the control loop circuit for the transit time correlator includes means for using an undifferentiated cross-correlation function as the controller input signal for determining and readjusting an adjustment point for the model delay time $\tau$.

2. A device for determining the velocity of an elongate textile material according to claim 1 wherein said first sensor $g_1$ has a point-symmetrical output characteristic curve.

3. A device for determining the velocity of an elongate textile material according to claim 1 or 2 wherein the second sensor $g_2$ has an output characteristic curve which is symmetrical in respect to a sensor center axis associated with said second sensor $g_2$.

4. A device for determining the velocity of an elongate textile material according to claim 1 wherein the output characteristic curve of the second sensor $g_2$ displays a balanced output.

5. A device for determining the velocity of an elongate textile material according to claim 1 wherein the output characteristic curve of the first sensor $g_1$ displays a balanced output.

6. A device for determining the velocity of an elongate textile material according to claim 1 wherein said first sensor $g_1$ and said second sensor g have output characteristic curves such that by imaginarily shifting one of the sensors by a predetermined amount equal to the effective distance L between the center axes of said first sensor and said second sensor in the direction toward the other sensor, the respective sensor output characteristic curves are periodic functions with a phase difference of 90°.

7. A device for determining the velocity of an elongate textile material according to claim 1 wherein said first sensor and said second sensor have output characteristic curves having a square waveform.

8. A device for determining the velocity of an elongate textile material according to claim 1 and further comprising a third sensor $g_3$ having an output characteristic curve the same as that of the second sensor $g_2$ and is disposed within said device at a position wherein an effective sensor center axis associated with said third sensor $g_3$ is coincident with an effective center axis associated with said first sensor $g_1$.

9. A device for determining the velocity of an elongate textile material according to claim 8 and further comprising a summation circuit for determining a difference between a second sensor signal $s_2$ and a third sensor signal $s_3$ and for forming a difference signal which is used with a first sensor signal for forming the cross-correlation function used as the controller input signal.

10. A device for determining the velocity of an elongate textile material according to claim 1 wherein a distance L between said first sensor $g_1$ and said second sensor $g_2$ is such that a minimum or maximum value of the sensor correlation function $R_{g_1 g_2}$, which adjoins the intersection of the sensor correlation function $R_{g_1 g_2}$ derived from the product of the sensor output characteristic curves with the abscissa, lies on the ordinate.

11. A device for determining the velocity of an elongate textile material according to claim 1 and further comprising a signal emitter $g_4$ which transmits velocity signals $s_4$ which are proportional to the yarn velocity, and signals $s_4$ from the signal emitter $g_4$ can be provided to the transit time correlator for range preselection for lock-on of the control loop circuit on a real intersection of the cross-correlation function $\Phi(\tau)$ with the abscissa.

* * * * *